Patented Mar. 29, 1949

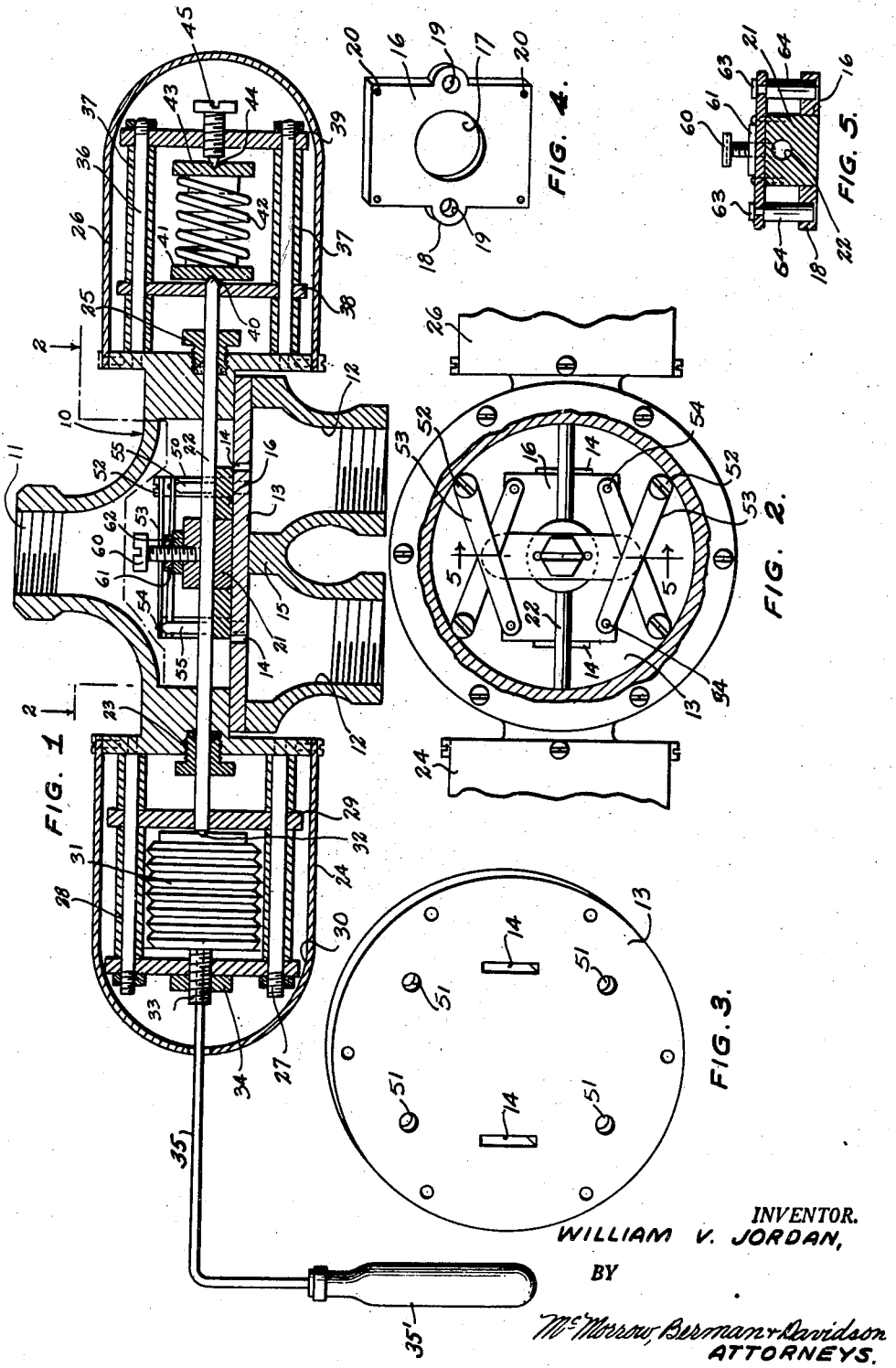

2,465,458

UNITED STATES PATENT OFFICE 2,465,458

MIXING VALVE

William Virgil Jordan, Waverly Hills, Ky.

Application May 29, 1947, Serial No. 751,261

3 Claims. (Cl. 236—12)

This invention relates to a mixing valve, and more particularly to a valve for mixing hot and cold fluids, such as water, in desired proportions to maintain the resultant mixture at a substantially constant temperature.

A primary object of the invention is the provision of an improved mixing valve adapted to mix hot and cold water in a desired proportion to provide a resultant mixture of substantially constant temperature, regardless of fluctuations in the temperature of the hot and/or cold water.

An additional object of the invention is the provision of such a device which will hold a temperature at any desired degree with a high proportion of accuracy, which may be utilized under any conditions wherein a flow of water of constant temperature is desired, such, for example, as in X-ray developing tanks, motion picture-processing tanks, film-developing tanks, shower baths, etc.

Another object of the invention is the provision of such a device provided with means whereby the desired temperature setting may be readily attained by a simple adjustment.

A further object of the invention is the provision of such a device which will be sturdy and durable in construction, reliable and efficient in operation, and relatively simple and inexpensive to manufacture, assemble and utilize.

Still other objects will in part be pointed out hereinafter, and in part be shown in the accompanying drawings, whereon there is disclosed a preferred embodiment of this inventive concept.

In the drawings:

Figure 1 is a longitudinal sectional view taken substantially along the center line of one form of mixing valve embodying features of the instant invention.

Figure 2 is a sectional view taken substantially along the line 2—2 of Figure 1, as viewed in the direction indicated by the arrows.

Figure 3 is a perspective view of the partition dividing the mixing valve.

Figure 4 is a perspective view of the slide valve comprising an element of the instant invention.

Figure 5 is a sectional view taken substantially along the line 5—5 of Figure 2, parts thereof being omitted for the sake of clarity.

Similar reference characters refer to similar parts throughout the several views of the drawings.

Referring now to the drawings in detail, the device of the instant invention is comprised of a body portion 10, including an outlet 11, and hot and cold water inlets 12. The body portion is divided by a centrally-disposed circular partition 13, secured therein in any desired manner, as by the conventional bolts or the like, sealing gaskets being provided if desired. The partition 13 is provided with two elongated slotted apertures 14, for the admission of hot and cold water to the mixing chamber on the side of partition 13 adjacent outlet 11. The admixture of hot and cold water on the opposite side of the partition is precluded by a transversely-extending partition member 15, dividing the flow of hot and cold water through the inlets 12, until such water has passed through the ports 14 and the partition 13.

Positioned on the inner side of partition 13 adjacent outlet 11 is a slide valve 16, of generally rectangular configuration, provided with a centrally-disposed aperture 17, ears 18 provided with bores 19, and at each corner thereof a depression 20, the purpose of which will be more fully pointed out hereinafter. The slide valve is adapted to be moved linearly along the partition 13, in such manner as to vary the relative open area of the hot and cold water ports 14 in accordance with the temperature of each in order to provide a desired resultant mixture.

Such movement is effected by means of a collar 21, adapted to seat in apertures 17 of the slide valve, and having passed diametrically therethrough a rod 22, one end of which extends through a suitable bore in the housing 10, and a packing nut 23 into a casing 24 at one end of the valve. The opposite end of the rod 22 is adapted to pass through a corresponding bore and packing nut 25 into a housing 26 at the opposite end of the valve assembly. The housing 24 is provided with a plurality of longitudinally-extending bolts 27, surrounded by spacers 28 adapted for the suitably positioning of transverse plates 29 and 30, between which is positioned a diaphragm bellows 31, one end of which is in contact with the extremity 32 of rod 22, which contacts the same through a suitable aperture in plate 29. The plate 30 is provided with a nipple 33, secured in position, as by a lock nut 34, and having an internal bore in communication with the interior of bellows 31. From the nipple 33 a flexible metallic tube 35 leads to a thermostatic element 35' suitably positioned in any desired locality for the expansion and contraction of the bellows in accordance with the temperature at said locality. Assuming that the thermostatic element is positioned in a developing tank or the like containing fluid passed through the outlet 11, it will now be seen that the expansion and contraction of the bellows in accordance with the temperature will serve to move the slide valve 16 to vary the relative quantity of hot and cold water passed through the ports 14. The housing 26 also contains a plurality of bolts 36 surrounded by spacers 37, for the suitable positioning of plates 38 and 39 similar to plates 29 and 30. The plate 38 is apertured to receive the extremity 40 of rod 22, which abuts an end plate 41, against which is seated one end of a compression spring 42, the other end of which is provided with an end cap 43, engaged by the pointed extremity 44 of an adjusting screw 45 passed through a suitable threaded aperture in the plate 39. It will thus be seen that the pressure biasing rod 22 toward diaphragm 31 may be suitably regulated by means of an adjusting screw 45, and that correspondingly the degree of expansion of bellows 31 and its corresponding movement of valve 16 may be pre-set to any desired temperature.

Means are provided for holding slide valve 20 closely adjacent partition 13, and take the form of studs 50 secured in suitable apertures 51 in partition 13. The studs 50 are provided with threaded apertures in their tops for the engagement of screws 52, which serve to secure the ends of leaf springs 53 thereto. It is to be noted that there are four of studs 50, and correspondingly four leaf springs 53, two on either side of the slide valve 16, the arrangement being such that the springs on each side are crossed, as best shown in Figure 2, and have their ends positioned substantially in alignment with the apertures 20 in the corners of valve 16. The free ends of each spring are provided with recesses 54 adapted to accommodate one end of needle-pointed pins 55, the opposite end of each pin seating in one of recesses 20. Thus, it will be seen that the slide valve 16 is effectively biased toward partition 13 by means of the resilient spring members 53, and held in position in such manner that free sliding thereof may be effected by movement of rod 22, due to the tapered extremities of the pins 55 and their engagement in the correspondingly tapered recesses 20 and 54.

It may here be pointed out that rod 22 is adapted to be secured in collar 21 by means of an adjustable set screw 60, extending through a suitable lock nut 61, in order that movement of the rod 22 may be effectively transmitted to the collar 21, and hence to the slide valve 16. The set screw permits relative adjustment of the rod should such become necessary.

Positioned between the lock nut 61 and the top of the collar 21 is a cross-bar 62, the ends of which are apertured to receive screws 63, which extend into studs 64, the lower extremities of which are seated in the apertures 19 of ears 18 of slide valve 16, thus further securing the parts in related assembly.

From the foregoing it will now be seen that there is herein provided a device which accomplishes all the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

I claim:

1. In a mixing valve, a body having an outlet and hot and cold water inlets, a partition in said body between said outlet and said inlets having hot and cold water ports therein, a slide valve on the outlet side of said partition operative to proportionately vary the relative opening of said ports, said valve having a centrally-positioned circular aperture therein, a collar slidably received in said aperture, a rod extending diametrically through said collar, a spring abutting one end of said rod, and a temperature-responsive element abutting the other end of said rod to move said rod and hence said valve linearly in accordance with temperature changes, and spring means carried by said partition resiliently holding said slide valve in operative contact with the partition adjacent said ports.

2. In a mixing valve, a body having an outlet and hot and cold water inlets, a partition in said body between said outlet and said inlets having hot and cold water ports therein, a slide valve on the outlet side of said partition operative to proportionately vary the relative opening of said ports, said valve having a centrally-positioned circular aperture therein, a collar in said aperture, a rod extending diametrically through said collar, a spring abutting one end of said rod, and a temperature-responsive element abutting the other end of said rod to move said rod and hence said valve on said partition relative to said ports in accordance with temperature changes, said valve being linearly movable on said collar toward and away from said partition, and spring means biasing said slide valve toward said partition, said spring means including studs secured to said partition, leaf springs carried by said studs, and means operatively interconnecting said leaf springs with said slide valve.

3. In a mixing valve, a body having an outlet and hot and cold water inlets, a partition in said body between said outlet and said inlets having hot and cold water ports therein, a slide valve on the outlet side of said partition operative to proportionately vary the relative opening of said ports, said valve having a centrally-positioned circular aperture therein, a collar in said aperture, a rod extending diametrically through said collar, a spring abutting one end of said rod, a temperature-responsive element abutting the other end of said rod to move said rod and hence said valve on said partition relative to said ports in accordance with temperature changes, said valve being movable on said collar toward and away from said partition, spring means biasing said valve toward said partition, said spring means including studs secured to said partition, leaf springs carried by said studs, and needle-pointed pins extending between the extremities of said leaf springs and said slide valve.

WILLIAM VIRGIL JORDAN.

REFERENCES CITED

The following references are of record in the file of this patent:

UNITED STATES PATENTS

| Number | Name | Date |
|---|---|---|
| 1,382,569 | Tait | June 21, 1921 |
| 1,900,221 | Beardsley | Mar. 7, 1933 |
| 1,980,624 | Kenney | Nov. 13, 1934 |